3,202,641
PREPARATION OF ACRYLONITRILE COPOLYMERS
Akira Nakajima, Nakano, and Kenji Takeya, Kanaoka, Saidaiji, Japan, assignors to Japan Exlan Company Limited, Osaka, Japan
Filed Sept. 4, 1962, Ser. No. 220,998
Claims priority, application Japan, Sept. 5, 1961, 36/32,549
5 Claims. (Cl. 260—79.3)

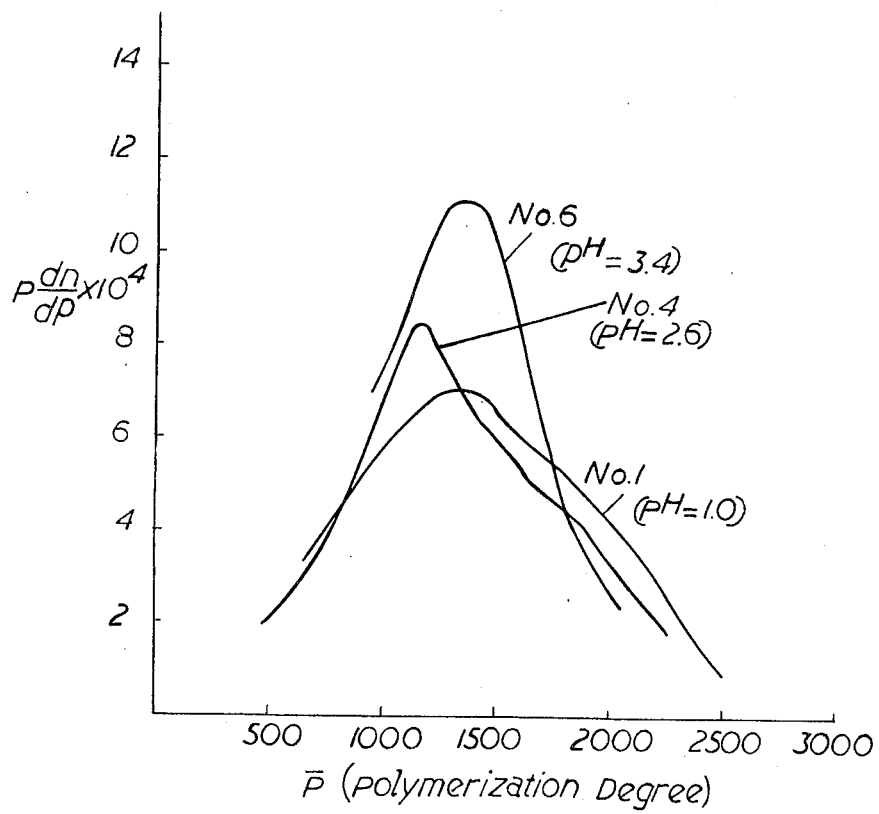

This invention relates to the preparation of copolymers of acrylonitrile and more particularly to the preparation of acrylonitrile copolymers having improved uniformity in particle size, composition and molecular weight.

Copolymers of acrylonitrile with one or more ethylenically unsaturated compounds are generally prepared by copolymerizing acrylonitrile and the selected ethylenically unsaturated monomer(s) in an aqueous medium in the presence of a polymerization catalyst to produce a slurry containing the desired copolymer which precipitates in the form of fine particles due to its insolubility in the aqueous medium. The polymer is separated from the slurry by a suitable means such as filtration, washed and then treated to remove water and is, if desired, further dried.

In this case, the polymerization reaction is initiated by the free radicals liberated from the catalyst and the reaction proceeds while a high molecular weight substance is induced to precipitate in the form of particles. The monomers still present in the system are then adsorbed on the formed polymer particles whereby the copolymerization is further allowed to proceed thereon so that the particles continue to grow. In the meantime, due to agitation or stirring, the collison and coalescence among said polymer particles are induced thereby the polymer is grown. It is thus apparent that the copolymer to be finally obtained would consist of secondary particles varying in size over a wide range. Particularly in a continuous polymerization system (as shown, for example, in U.S. Patent No. 2,777,832) wherein monomeric substances and catalysts are continuously fed in the reaction system and the resulting slurry containing polymer is continuously discharged from said system, it is inevitable that polymer particles of relatively small size which have just precipitated are also discharged together with those polymer particles of fairly large size which have stayed long in the reaction system.

It is known that the copolymer employed in the manufacture of fibres is preferably uniform in both molecular weight and composition.

Therefore, it is a primary object of this invention to provide a method for preparing acrylonitrile copolymer which is improved in uniformity of particle size, molecular weight and composition.

Other objects of the invention, and features and advantages thereof will be apparent from the following detailed description and from the accompanying drawing which is a graph showing the distribution of polymerization degrees of copolymers produced under various pH conditions.

We have found that when acrylonitrile is copolymerized with one or more of ethylenically unsaturated compounds in an aqueous medium in the presence of an unsaturated organic sulfonic acid or its salt and at a pH within a specific range, there is obtained a copolymer which has uniform and small particle size hence is uniform in the distribution of molecular weight and composition.

In carrying out the method of this invention a monomeric mixture in which acrylonitrile predominates (e.g. mole than 85% by weight) is employed. The monomers other than acrylonitrile are vinyl or ethylenically unsaturated compounds copolymerizable with acrylonitrile. Examples of these copolymerizable ethylenically monomers are vinyl chloride, vinylidene chloride, vinyl acetate, vinyl monochloroacetate, methyl acrylate, methyl methacrylate, acrylic acid, methacrylic acid, acrylic amide, methyl vinyl pyridine, styrene, etc. Unsaturated organic sulfonic acids and their salts are excluded from the "monomers" as used herein.

The polymerization is carried out in an aqueous medium. A typical medium is water. Any of the catalysts or initiators known in the art of polymerization of acrylonitrile may be employed. Examples of useful polymerization catalysts or initiators are water soluble peroxides such as ammonium persulfate, potassium persulfate, hydrogen peroxide and the like, and redox catalytic system such as of a combination of a peroxide and sulfite, e.g., chlorate-sulfite which is most preferable in the method of this invention.

The polymerization temperature may vary widely (e.g. from 20° C. to 80° C.) depending particularly upon the initiator employed. Preferably, the temperature is from 40° C. to 70° C. when a peroxide catalyst or initiator is employed, while when a redox catalyst is employed preferable polymerization temperature is from 20° C. to 70° C.

The polymerization time may also vary widely depending upon the polymerization condition. However, generally, the monomeric material can be copolymerized to a desired extent within about 50 minutes to three hours.

The polymerization may be conducted batchwise or continuously in a conventional manner.

The above mentioned polymerization procedure is well known in the art and conventional, so that no further and detailed explanation will be necessary except the following description relating to the essential and distinctive conditions which are the feature of this invention.

The distinctive feature of this invention is to incorporate special conditions into the above outlined polymerization procedure, as fully described below.

Thus the important feature of this invention is to carry out the above mentioned polymerization in the presence of an unsaturated organic sulfonic acid or its salt. Typical examples of the unsaturated organic sulfonic acid are allyl sulfonic acid, methallyl sulfonic acid, allyloxyethyl sulfonic acid, methallyloxyethyl sulfonic acid, allyloxypropanol sulfonic acid, allylthioethyl sulfonic acid, allylthiopropanol sulfonic acid, etc. These unsaturated organic sulfonic acids may be used also in the form of water soluble salts such as salts of ammonium, sodium, potassium, lithium, magnesium, zinc, calcium, aluminium and other metals. The amount of the unsaturated organic sulfonic acid or its salt is from about 0.1% to about 3% by weight, preferably from about 0.1% to about 2% by weight based on the total weight of the monomers. If this amount is less than about 0.1% the effect of the unsaturated organic acid or its salt is too small to attain the object of this invention. If the amount is higher than this amount the resulting copolymer would contain from 2 to 3% or more of sulfonated monomer(s) copolymerized therein so that the fibres or other shaped articles made of such copolymer would have some undesirable physical properties.

A further important feature in this invention lies in the pH control of the reaction system. It has been found that, although the polymerization may be effected at a pH from 0.5 to 6, it is most preferable to carry out the polymerization at a pH within the range from 2 to 3.5. If the polymerization is carried out at a pH lower than 2 the resulting copolymer is not satisfactorily uniform in the particle size and furthermore the particle size is undesirably large. On the other hand, if the polymerization is carried out at a pH higher than 3.5 it is difficult to control the pH of the system particularly when a redox catalyst such as chlorate-sulfite is employed. A small variation in the supply of an acid could raise the pH beyond 6 thereby inhibiting the polymerizaiton reaction. In order to control the pH of the polymerization system, a suitable amount of an acid which has a dissociation constant higher than $10^{-3}$ and which is resistant to oxidation may be used. Examples of acids useful for this purpose are sulfuric acid, nitric acid, phosphoric acid, hydrochloric acid and other strong acids.

By the use of the unsaturated organic sulfonic acid or its salt and by controlling the pH of the polymerization system or slurry as mentioned above in the polymerization process, the resulting copolymer becomes smaller in particle size and more uniform in molecular weight and composition. While the exact reason why such favorable results are obtained according to this invention is not entirely clear, it is presumed that a portion of the sulfonic acid compound employed enters into each copolymer particle so that the latter would contain the functional groups of said acid or salt. The functional groups are then dissociated to form $-SO_3^-$ ions, depending upon the pH of the system so that the particles carry such negative charges Due to these negative charges, cohesion of the particles is prevented thus maintaining the small uniform size. The uniformity of particle size would tend to average the tendencies of different polymeric particles to adsorb monomers, so that the resulting copolymer would be uniform also in the molecular weight and composition.

After the polymerization the resulting slurry containing the copolymer may be subjected to a conventional treatment to separate the copolymer therefrom. Thus, for example, the slurry is filtered by means for example of a centrifugal separator to recover the copolymer. The copolymer is then washed with water and dehydrated by means of a centrifuge. If desired, the polymer may be further dried.

The copolymer thus obtained may be used in the production of fibres or other shaped articles in a conventional manner. Since the copolymer obtained in accordance with the present invention is small or fine in particle size its solubility in a solvent such as an aqueous concentrated solution of an inorganic salt such as potassium thiocyanate, sodium thiocyanate, ammonium thiocyanate, etc. or an organic solvent such as dimethyl sulfoxide, dimethyl formamide, dimethyl acetamide, etc. is high and the time required for dissolving the polymer into these solvents may be reduced. This is quite convenient in preparing a polymer solution for spinning.

Finally, it should be pointed out that although unsaturatde organic sulfonic acid and their salts used in this invention may be copolymerizable with acrylonitrile the amount of the same is very small (i.e. about 0.1 to 3% by weight based on the total monomer weight) so that the content of the same in the resulting copolymer is negligibly small. Thus, for example, when $$CH_2=C(CH_3)-CH_3-SO_3Na$$

is added in an amount of 3%, 1%, 0.75%, 0.5% and 0.25% by weight based on the total weight of the monomeric mixture, the resulting copolymers will contain only 0.80%, 0.43%, 0.35%, 0.33% and 0.24% by weight of sulfonic acid groups respectively based on the weight of the respective polymers.

The invention is further illustrated in the following examples. In these examples, all parts and percentages are by weight unless otherwise indicated.

EXAMPLE 1

A continuous polymerization reactor (volume 10 l.) fitted with a stirrer (450 r.p.m.) and a heating jacket to maintain the interior temperature at 45° C. was continuously charged with a monomeric mixture of 90 parts acrylonitrile and 10 parts methyl acrylate and also with 0.5 part sodium methallyl sulfonate, 0.26 part sodium chlorate, 2.46 parts sodium sulfite and 257 parts water. In addition to the above charge, nitric acid in various amounts to adjust the pH of the reaction system as indicated in the following Table I was also added. For the purpose of comparison, in some instances, the same reaction mixture except that sodium methallyl sulfonate was omitted was continuously charged with varying pH given in Table I. In each instance, the rate of charge was such that the average residence time of the polymerization mixture in the reactor was 80 minutes. The polymerization was allowed to proceed at 45° C. while stirring and the resulting slurry containing the copolymer was continuously discharged from the reactor. After about 6 hours the polymerization state became substantially stable or constant so that the slurry discharged was subjected to analysis. Thus the slurry was filtered by means of a centrifugal separator to recover the polymer particles, which were then washed with water and dehydrated by means of a centrifugal separator. The product thus obtained was sorted by standard sieves or screens (standard according to JIS). The following Table I shows the percentages by weight of the copolymer particles by different mesh-sizes.

Table I

| Exp. No. | Sodium methallyl-sulfonate, percent based on monomers | pH | Percentages by particle size | | |
| --- | --- | --- | --- | --- | --- |
| | | | >42 mesh (coarse) | 42-150 mesh (medium) | <150 mesh (fine) |
| 1 | 0.5 | 1.0 | 14.3 | 31.9 | 53.8 |
| 2 | 0.5 | 1.3 | 1.2 | 32.7 | 66.1 |
| 3 | 0.5 | 1.9 | 0 | 12.2 | 87.8 |
| 4 | 0.5 | 2.6 | 0 | 3.6 | 96.4 |
| 5 | 0.5 | 2.9 | 0 | 2.0 | 98.0 |
| 6 | 0.5 | 3.4 | 0 | 0.4 | 99.6 |
| 7 | None | 0.8 | 13.4 | 21.6 | 65.0 |
| 8 | None | 1.9 | 14.6 | 25.0 | 60.4 |
| 9 | None | 2.7 | 10.6 | 27.3 | 62.1 |

It will be apparent from the above table that where no sodium methallyl sulfonate was employed, with other conditions being held unchanged, no substantial variation was observed in the distribution of particle size even when the pH of the reaction system was changed. On the contrary, where sodium methallyl sulfonate was present the particle size distribution of the copolymer was greatly affected by pH, that is as the pH increases the proportion of fine particles passing through 150 mesh sieve increases while the proportion of coarse particles which do not pass through 42 mesh sieve decreases.

A portion of each of the copolymers of the Experiments Nos. 1, 3, 6, 7, 8 and 9 was further sub-sorted by 42 mesh, 150 mesh, 250 mesh and 325 mesh screens. In the following Table II are given average molecular weight of the copolymer of each of the groups as sorted.

Table II

| Exp. No. | Sodium methallyl sulfonate percent based on monomers | pH | Particle size and molecular weight | | | | | | | | | |
|---|---|---|---|---|---|---|---|---|---|---|---|---|
| | | | >42 mesh | | 42-150 mesh | | 150-250 mesh | | 250-325 mesh | | <325 mesh | |
| | | | Wt. percent | MW | Wt. percent | MW | Wt. percent | MW | Wt. percent | MW | Wt. percent | MW |
| 1 | 0.5 | 1.0 | 14.3 | 83,400 | 31.9 | 79,900 | 7.6 | 77,400 | 2.7 | 74,100 | 43.5 | 69,600 |
| 3 | 0.5 | 1.9 | 0 | -------- | 12.2 | 77,900 | 37.9 | 76,200 | 10.5 | 73,800 | 39.4 | 72,400 |
| 6 | 0.5 | 3.4 | 0 | -------- | 0.4 | 75,900 | 22.1 | 74,700 | 27.1 | 73,900 | 50.4 | 72,300 |
| 7 | None | 0.8 | 13.4 | 85,800 | 21.6 | 77,700 | 20.6 | 71,800 | 13.4 | 71,100 | 33.0 | 66,800 |
| 8 | None | 1.9 | 14.6 | 79,300 | 25.0 | 76,900 | 14.6 | 73,000 | 8.0 | 70,700 | 46.4 | 67,000 |
| 9 | None | 2.7 | 10.6 | 80,200 | 27.3 | 78,000 | 19.0 | 73,900 | 17.5 | 72,800 | 48.8 | 70,000 |

MW: Molecular weight of the polymer as determined according to the formula $[\eta] = 1.5 \times 10^{-4} M$, using dimethylformamide solution of the polymer.

Further, each of the copolymers of the Experiments Nos. 1, 4 and 6 was analyzed to determine the molecular weight distribution by a fractional sedimentation method using dimethyl formamide-ether system. Thus, the selected copolymer was dissolved in dimethylformamide and ether was added to the solution as a precipitating agent. The precipitated copolymer was separated quickly by Beckman's Spinco L-type ultra centrifuge. This procedure was repeated to effect fractional precipitation and separation. The result is shown in the graph of the drawing.

From the foregoing Table II and the graph shown in the drawing it will be apparent that the increase in pH within the range of this invention in the presence of sodium methallyl sulfonate would result in more uniformity of the molecular weight.

EXAMPLE 2

A continuous polymerization reactor (volume 10 l.) fitted with a stirrer (540 r.p.m.) and a heating jacket was continuously charged with a monomeric mixture of 90 parts acrylonitrile and 10 parts methyl acrylate, and also with 2 parts sodium allylsulfonate, 0.36 part sodium chlorate, 1.28 parts sodium sulfite and 270 parts water. In addition thereto, nitric acid in various amounts to adjust the pH of the reaction system as indicated in the following Table III was also added. In each instance, the rate of charge was such that the average residence time of the polymerization mixture in the reactor was 60 minutes. The polymerization was allowed to proceed at 60° C. while stirring and the resulting slurry containing the copolymer was continuously discharged from the reactor. After about 5 hours the polymerization became substantially stable or constant so that the slurry discharged was subjected to analysis. Thus the slurry was filtered by a centrifugal separator to recover the polymer particles, which were then washed with water and dehydrated by a centrifugal separator. The product thus obtained was sorted by standard sieves or screens (standard according to JIS). The following Table III shows the percentages by weight of the copolymer particles by different mesh-size.

Table III

| Exp. No. | pH | Percentages by particle size | | |
|---|---|---|---|---|
| | | >42 mesh | 42-150 mesh | <150 mesh |
| 11 | 1.2 | 0.1 | 16.3 | 83.6 |
| 12 | 1.7 | 0.1 | 8.3 | 91.6 |
| 13 | 2.3 | 0.1 | 2.8 | 97.1 |
| 14 | 2.7 | 0.1 | 2.7 | 97.2 |

It will be apparent also from the above table that the particle size of copolymer may be changed by controlling the pH of the system in the presence of sodium allylsulfonate.

EXAMPLE 3

The procedure of Example 1 was repeated except that the pH adjustment was carried out by sulfuric acid instead of nitric acid. The results obtained were substantially identical with those of Example 1.

EXAMPLE 4

The procedure of Example 1 was repeated except that 88 parts of acrylonitrile, 12 parts of methyl methacrylate and 0.75 parts of sodium methallyl sulfonate were employed. The results obtained were substantially identical with those of Example 1.

EXAMPLE 5

The procedure of Example 2 was repeated except that 95 parts of acrylonitrile, 5 parts of vinyl acetate and 1 part of potassium allyl sulfonate were employed. The results obtained were substantially identical with those of Example 2.

What we claim is:

1. A process for producing a copolymer of acrylonitrile and at least one ethylenically unsaturated compound which comprises copolymerizing a mixture of the monomers containing at least 85% by weight of acrylonitrile in an aqceous organic solvent free medium in the presence of a chlorate sulfite catalyst, the process being characterized by the fact that the polymerization is carried out in the presence of at least one sulfonic acid compound selected from the group consisting of ethylenically unsaturated aliphatic sulfonic acids and their water soluble salts in an amount of from 0.1 to 3% by weight based upon the total weight of the monomeric mixture, and at a pH from 2 to 3.5

2. A process according to claim 1 in which the sulfonic acid compound is sodium methallyl sulfonate.

3. A process according to claim 1 in which the pH of the system is adjusted by a strong acid having a dissociation constant higher than $10^{-3}$ and which is resistant to oxidation.

4. A process according to claim 3 in which the acid is selected from the group consisting of sulfuric acid, nitric acid, phosphoric acid and hydrochloric acid.

5. A process according to claim 1, in which the amount of the sulfonic acid compound is from 0.1 to 2% by weight based on the total weight of the monomeric mixture.

References Cited by the Examiner

UNITED STATES PATENTS 2,601,256  6/52  Bruson _____ 260—79.3
3,020,265  2/62  Tietz _____ 260—79.3

JOSEPH L. SCHOFER, *Primary Examiner.*

DONALD E. CZAJA, *Examiner.*